United States Patent
Ito

(10) Patent No.: US 6,917,752 B2
(45) Date of Patent: Jul. 12, 2005

(54) SYSTEM AND METHOD FOR EDITING VIDEO INFORMATION

(75) Inventor: Seigo Ito, Hanno (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 504 days.

(21) Appl. No.: 10/225,199

(22) Filed: Aug. 22, 2002

(65) Prior Publication Data

US 2002/0191957 A1 Dec. 19, 2002

Related U.S. Application Data

(63) Continuation of application No. 09/195,242, filed on Nov. 18, 1998, now Pat. No. 6,532,333.

(30) Foreign Application Priority Data

Nov. 19, 1997 (JP) ............................................. 9-318164

(51) Int. Cl.⁷ .............................. H04N 5/93; H04N 7/26
(52) U.S. Cl. .......................................... 386/52; 386/111
(58) Field of Search ........................... 386/52, 109, 111, 386/112, 27, 33, 46, 4, 1, 124, 125, 113, 40, 45, 21; H04N 5/93, 7/26

(56) References Cited

U.S. PATENT DOCUMENTS

| | | | |
|---|---|---|---|
| 5,732,183 A | 3/1998 | Sugiyama | 386/4 |
| 5,732,783 A | 3/1998 | Truax et al. | 175/374 |
| 5,793,894 A | 8/1998 | Sugiyama | 382/236 |
| 5,802,240 A | * 9/1998 | Asai | 386/52 |
| 5,841,942 A | 11/1998 | Sugiyama | 386/109 |
| 6,125,140 A | * 9/2000 | Wilkinson | 375/240 |
| 6,157,771 A | 12/2000 | Brewer et al. | 386/69 |
| 6,201,925 B1 | 3/2001 | Brewer et al. | 386/52 |
| 6,285,361 B1 | 9/2001 | Brewer et al. | 345/328 |

FOREIGN PATENT DOCUMENTS

JP          8-37640          2/1996

OTHER PUBLICATIONS

Notification of Reasons for Rejection issued by the Japanese Patent Office, dated Jan. 11, 2005, for Japanese Patent Application No. 1997–318164, and English–language translation thereof.

* cited by examiner

*Primary Examiner*—Bob Chevalier
(74) *Attorney, Agent, or Firm*—Finnegan, Henderson, Farabow, Garrett & Dunner, L.L.P.

(57) ABSTRACT

This invention relates to a recording/reproduction system having a function of recording/reproducing video information with a GOP structure in the MPEG2 scheme on/from a disk. In this system, when a cut position designated by the user on the reproduction frame is set within the GOP, start picture data in the latter half of video data using the cut position as the reference position is set to I picture data. That is, when the picture data is of the B type, the CPU controls an encoder/decoder to change the picture data to I picture data. Accordingly, the latter half can be generated as reproducible video data.

8 Claims, 7 Drawing Sheets

SYSTEM AND METHOD FOR EDITING VIDEO INFORMATION

This application is a continuation and claims the under 35 U.S.C §120 of U.S. patent application Ser. No. 09/195,242, filed Nov. 18, 1998, now U.S. Pat. No. 6,532,333 which claims the benefit under 35 U.S.C. §119 of Japanese application No. 9-318164, filed Nov. 19, 1997, the contents of which are incorporated herein by reference in their entirety.

BACKGROUND OF THE INVENTION

The present invention relates to a video information recording/reproduction system for recording video information composed of digital video information on a disk storage medium and reproducing video information from the disk storage medium.

In recent years, recording/reproduction systems for recording and reproducing so-called multimedia information such as digital video information or still image, audio information, and character information are extensively developed. Particularly, a DVD (Digital Video Disk) drive using a DVD as a storage medium has received a great deal of attention. The DVD drive includes a read-only DVD-ROM drive and a DVD-RAM drive which allow recording and reproduction.

In particular, the DVD-RAM drive has not only a function of reproducing multimedia information recorded on the DVD in advance but also a function of recording digital video information transmitted from, e.g., a digital broadcasting station. The DVD-RAM drive has therefore received attention as not only a video player or videocassette recorder for reproducing video information on the screen of a television receiver but also an external storage device for a personal computer. The DVD-RAM drive is a promising storage medium incorporated in an apparatus such as a set top box or IRD (Integrated Receiver Decoder) which has a digital satellite broadcasting receiver (including an antenna) and displays received digital video information on the display (screen) of a television receiver or personal computer.

Using the recording/reproduction function of the DVD-RAM relatively easily realizes an edit function of editing video information recorded on the DVD-RAM. The video information edit function is to cut (remove) desired frame information included in full-motion video continuously reproduced on the screen of the television receiver or the like, and to extract desired frame information into another video information. Realizing this edit function requires a function capable of editing desired frame information in full-motion video in units of frames (or units of pictures) designated by the user.

Video information recorded on the DVD-RAM is generally encoded (compressed) by a moving picture coding scheme called MPEG (Moving Picture coding Experts Group) 2. This MPEG2 scheme employs a so-called GOP (Group Of Pictures) structure. The GOP structure is used to process video data as an access unit obtained by grouping a plurality of pictures (frames), and is generally composed of about 15 frames (reproduction time: about 0.5 sec).

One GOP is composed of a predetermined number of pictures of a plurality of picture types (to be referred to as picture data hereinafter). The picture type means the type of encoded image and includes three types of pictures, i.e., an I picture (Intracoded image), a P picture (Predictive coded image), and a B picture (Bidirectionally predictive coded image). The I picture is frame information which can be decoded independently of another type of picture data (without any preceding and succeeding frame information). The P picture is frame information which can be decoded using difference information from the I picture. The B picture is frame information which can be decoded using difference information from the preceding I picture and difference information from the succeeding P picture. That is, the P and B pictures except for the I picture are encoded images which cannot be decoded by themselves.

As described above, editing digital video information using the DVD-RAM requires a function capable of editing the information in units of frames (or units of pictures) designated by the user. However, in the recording/reproduction system employing the MPEG2 scheme, when the video data process unit (i.e., coding unit) is the GOP, a position within the GOP may be designated as a reference position for dividing video information. More specifically, when video information (continuous reproduction data unit including a GOP header) composed of a plurality of GOPs is divided at a desired position, a picture within a given GOP may be designated as a division boundary.

The GOP is composed of a plurality of picture types of picture data, as described above. When, e.g., the former half of video data is cut (removed) at a designated division position, the start picture in the latter half of the video data may be a P or B picture. Since the P or B picture cannot be independently decoded, video information including the latter half of the video data causes a reproduction error. If the start picture is an I picture, the video information can be reproduced without any problem. Namely, in the system wherein video data is processed in units of GOPs, like the MPEG2 scheme, the data can be easily edited in units of GOPs but cannot be practically edited in units of pictures within the GOP.

BRIEF SUMMARY OF THE INVENTION

It is an object of the present invention to provide a video information recording/reproduction system capable of, when video information composed of GOP-unit video data is to be edited, dividing the video information using a division position designated within a GOP and improving the video information edit function regardless of the type of picture corresponding to the division position.

More specifically, the present invention is used for a recording/reproduction system having a function of recording video information having a data structure such as a GOP structure in the MPEG2 scheme on a disk recording medium, and reproducing video information from the disk recording medium. This system comprises setting means for setting frame information designated by the user on the screen as a reference position for dividing the video information reproduced on the screen of the display. The setting means allows to set the reference position within the GOP serving as access-unit video data. The setting means comprises a command input function for an editing process.

This system further comprises determination means for determining the picture type of start picture data starting from the reference position set within the GOP by the setting means. The determination means determines whether the picture type of start picture data is the I type. Upon reception of the determination result, change means changes the picture data to I picture data when the start picture data is not of the I type. More specifically, when the start picture data is of the I type, the change means does not change the picture data. Edit means of this system edits GOP video data composed of one video data portion including the I picture data obtained by the change means and the other video data portion. In this system, when the other video data portion is included in video information to be cut, it is changed to reproduction invalid data which cannot be a target to be reproduced.

According to the recording/reproduction system of the present invention, in an editing process of cutting part of video information processed as continuous reproduction data, even if the cut position (reference position for division) is within the GOP, the start picture at the cut position can be set to an I picture which can always be independently decoded. Even if part of the GOP is included in video data to be cut, video data starting from the cut position can be reproduced. Therefore, in editing video information in units of GOPs composed of a plurality of picture types of picture data, the cut position can be freely set. Even if the cut position is within the GOP, an editing process of using necessary video data and cutting unnecessary video data can be easily realized.

According to another aspect of the present invention, the system comprises copy means for copying GOP video data set by the setting means in a predetermined area of the disk storage medium. Using the copy means can decode the edited GOP video data to original video data. An original GOP composed of cut video data and edited video data within the GOP can be decoded to decode video information before edition.

According to the present invention, in the digital video information recording/reproduction system using, e.g., a DVD-RAM, particularly when the scheme employing the MPEG2 picture coding and GOP structure is applied, video information can be divided at a division position designated within the GOP regardless of the type of picture at the division position. When video information composed of GOP-unit video data is edited, an editing process within the GOP can be realized, thereby improving the video information edit function.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Embodiments of the present invention will be described below with reference to the several views of the accompanying drawing.

Figure 1:
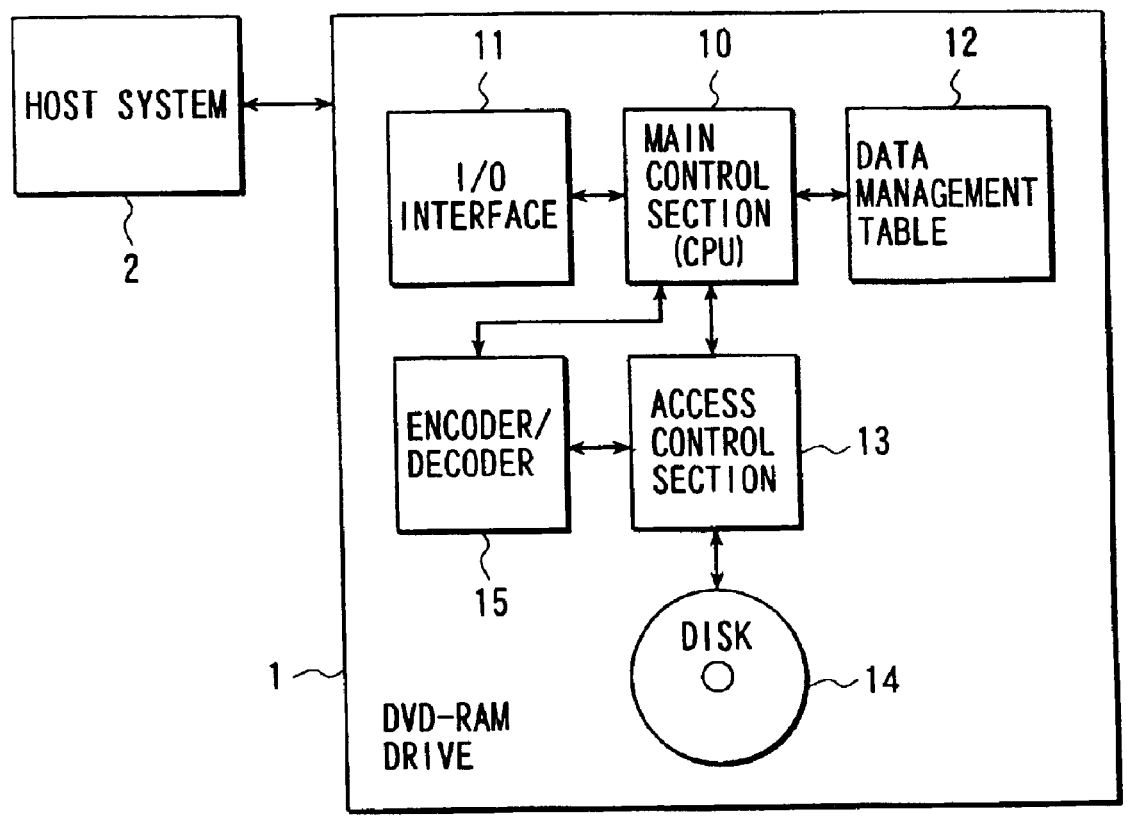
FIG. 1 is a block diagram showing the main part of a recording/reproduction system according to embodiments of the present invention.

FIG. 1 is a block diagram showing the main part of a recording/reproduction system according to an embodiment. (System Arrangement)

As shown in FIG. 1, this system is constituted by a DVD-RAM drive 1 and a host system 2. The host system 2 comprises a personal computer or set top box having a function of displaying digital video information on the screen of a television receiver. The host system 2 comprises at least a display (screen) for reproducing digital video information and an input unit (keyboard or mouse) for inputting various commands necessary for a video information editing process related to this embodiment.

The DVD-RAM drive 1 mainly comprises a main control section 10, an I/O interface 11, a data management table 12, an access control section 13, a disk (DVD) 14, and an encoder/decoder 15.

The I/O interface 11 controls input/output of video information and various commands from/to the host system 2. The main control section 10 is a microprocessor (to be referred to as a CPU hereinafter), which controls the video information editing process related to this embodiment, the access control section 13, and the encoder/decoder 15. In this embodiment, the data management table 12 means a memory for storing table information for managing recording/reproduction of video information, and conceptually includes a table information storage area on the disk 14. The data management table 12 stores, e.g., the start address and length of each video information.

The disk 14 is a DVD capable of recording/reproducing digital video information, and a storage medium for so-called multimedia information including digital video information. The access control section 13 executes recording/reproduction with respect to the disk 14 under the control of the CPU 10. The encoder/decoder 15 executes moving picture coding and moving picture decoding according to the MPEG2 scheme related to this embodiment.

In the recording/reproduction system shown in FIG. 1, the first embodiment will be described with reference to FIGS. 2 to 4, the second embodiment will be described with reference to FIGS. 5 and 6, and the third embodiment will be described with reference to FIGS. 7 and 8.
(First Embodiment)

The first embodiment will describe an editing process of reproducing and using the latter half of video data within the GOP from the reference position, while invalidating reproduction of the former half of the video data when video information is to be divided at a reference position within the GOP.

A video information processing method common to the first and remaining embodiments will be explained with reference to FIGS. 2 and 3. The data management table 12 includes management information for managing an access to pieces of video information 20a and 20b. The data management table 12 comprises EXTENT management tables (to be referred to as EX-management tables hereinafter) 12a and 12b for the pieces of video information 20a and 20b to be managed. In the EX-management tables 12a and 12b, e.g., file names, time stamps, and the like are stored. As shown in FIG. 3, the data management table 12 includes management information for managing continuous reproduction of video information to be valid or invalid for each EX-management table.

Figure 2:
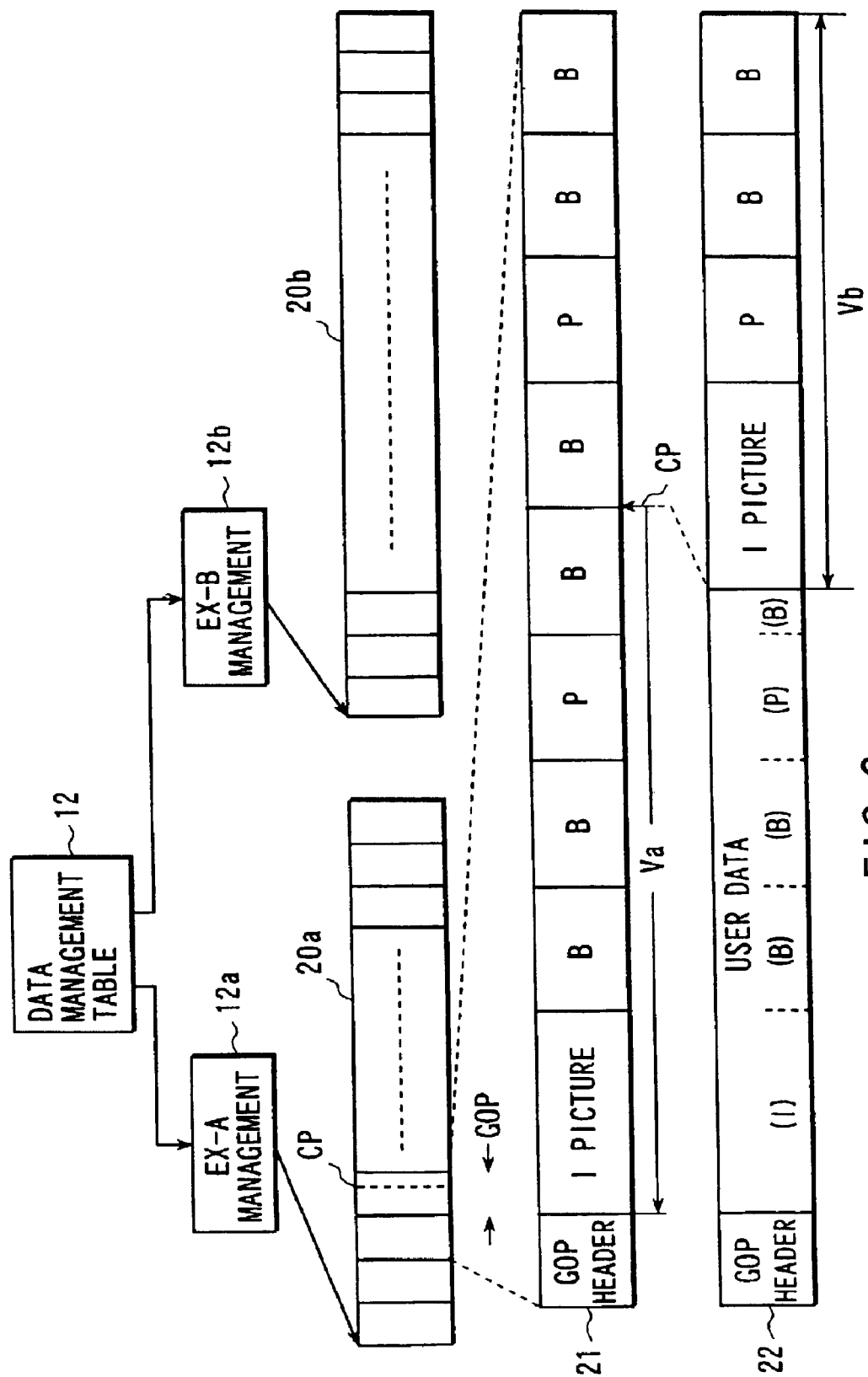
FIG. 2 is a conceptual view for explaining the operation of the first embodiment.

As shown in FIG. 2, the EX-management table 12a manages the video information 20a (one EXTENT data), whereas the EX-management table 12b manages the video information 20b (one EXTENT data). Each of the pieces of video information 20a and 20b is a stream using the GOP as a video data unit. A GOP 21 is video data starting from a GOP header that is prepared by grouping picture data of I, P, and B types corresponding to a plurality of frames (about 15 frames). The I, P, and B types mean an I picture (Intracoded image), a P picture (Predictive coded image), and a B (Bidirectionally predictive coded image) complying with the MPEG2 standard. The I picture is frame information which can be decoded independently of another type of picture data (without any preceding and succeeding pieces of frame information). The P picture is frame information which can be decoded using difference information from the I picture. The B picture is frame information which can be decoded using difference information from the preceding I picture and difference information from the succeeding P picture. That is, the P and B pictures except for the I picture are encoded images which cannot be decoded by themselves.

The operation of the first embodiment will be described with reference to a flowchart in FIG. 4. The CPU 10 of the DVD-RAM drive records on the disk 14 digital video information transferred from the host system 2 via the I/O interface 11 (S1). The CPU 10 reads the recorded video information from the disk 14 and transfers it to the host system 2 via the I/O interface 11 in accordance with a command from the host system 2 upon an input from the user (step S2). Then, the video information (e.g., video information 20a in FIG. 2) designated by the user is reproduced on the display of the host system 2.

Assume that the user operates, e.g., the mouse to designate a cut position for cutting the former half of the video information 20a while confirming the display (step S3). The CPU 10 specifies a GOP corresponding to the designated cut position and a cut position CP within the GOP on the basis of management information of the data management table 12 (step S4). As shown in FIG. 2, the cut position CP designated by the user is within a GOP included in the video information 20a.

The CPU 10 uses the cut position CP in the specified GOP 21 to detect the type of start picture in the latter half of the video data (composed of B, P, B, B picture data in FIG. 2) (step S5). In this case, the CPU 10 recognizes the start picture type by referring to, e.g., the GOP header. If the start picture type is the I type, the CPU 10 changes a former half Va of the video data from the cut position CP to reproduction invalid data (YES in step S6; and S7). The reproduction invalid data is user data (dummy data) which cannot be a target to be reproduced as video information. In this case, the former half Va of the video data is practically changed to reproduction invalid data by changing the contents of the GOP header without changing the picture data.

If the start picture type is not the I type, a latter half Vb of the video data is a B (or P) picture which cannot be independently decoded in reproduction, and thus cannot be reproduced as video data without any change. In the present invention, therefore, the start picture type is changed to the I type by controlling the encoder/decoder 15 (NO in step S6). More specifically, the CPU 10 decodes the B picture data to original video data using both the I and P picture data of the GOP 21 (step S8). The CPU 10 encodes the original video data to I picture data (step S9).

The I picture data has a larger data amount than that of the B or P picture data. The CPU 10 therefore extends the area of the latter half Vb of the video data to the former half area by an increase in data amount upon a change to the I picture data (step S10). The CPU 10 generates a new GOP 22 in which the former half Va of the video data is changed to reproduction invalid data (step S11).

Figure 3:
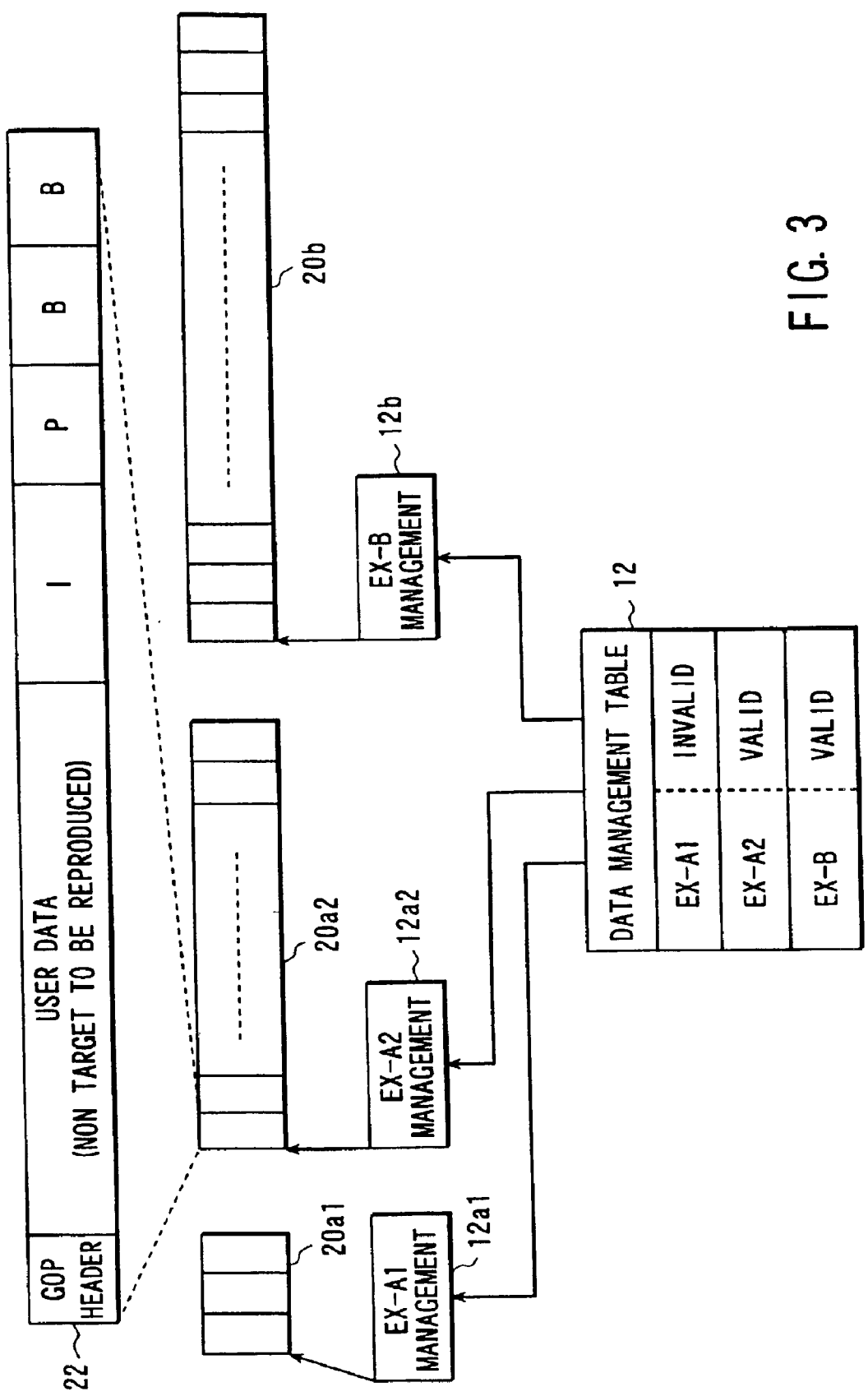
FIG. 3 is a conceptual view for explaining the operation of the first embodiment.
Figure 4:
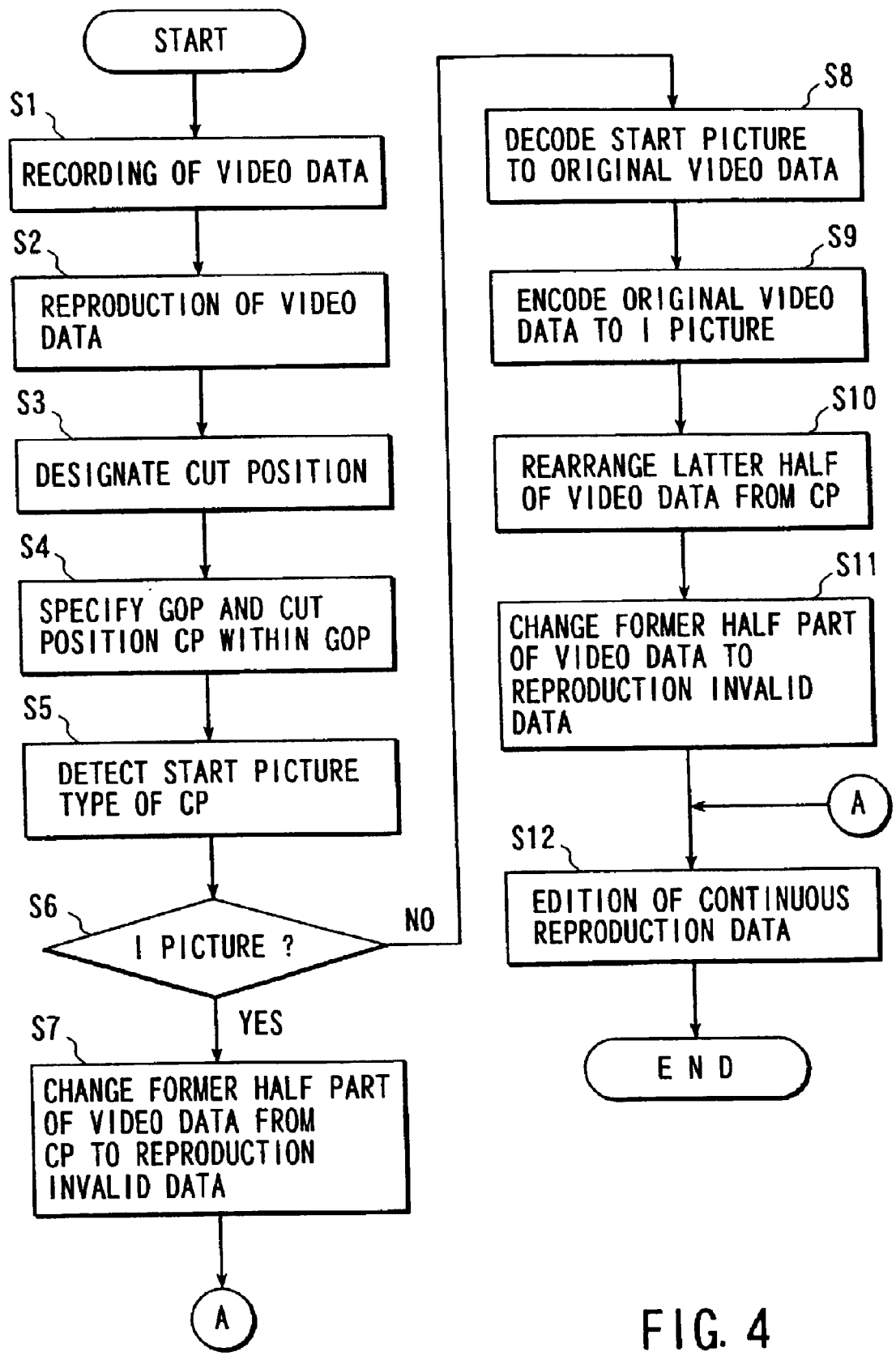
FIG. 4 is a flowchart for explaining the operation of the first embodiment.

Upon completion of the change within the GOP, as shown in FIG. 3, the CPU 10 sets an EX-A2 management table 12a2 for managing video information 20a2 including the newly generated GOP 22, and an EX-A1 management table 12a1 for managing video information 20a1 to be cut (step S12). The data management table 12 manages as continuous reproduction data each of the video information 20a2 managed by the EX-A2 management table 12a2 and the video information 20b managed by the EX-B management table 12b. The data management table 12 manages the video information 20a1 to be cut as non-reproducible data.

According to the first embodiment, in an editing process of cutting the former half of the video information 20a being reproduced, even if the designated cut position CP is within the GOP, the GOP 21 can be divided at the position CP into the latter half Vb to be reproduced and the former half Va to be changed to data which cannot be a target to be reproduced (i.e., to be cut). This editing process allows the user to reproduce the video information 20a2 of the newly generated GOP 22 as the start. The video information 20a2 is edited video composed of the latter half of video data (including the latter half Vb of the GOP 22) with respect to the cut position CP designated by the user. As shown in FIG. 3, the former half 20a1 with respect to the cut position CP, and the former half of the GOP 22 except for the latter half Vb are cut as reproduction invalid data from the original video information 20a.

(Second Embodiment)

Figure 5:
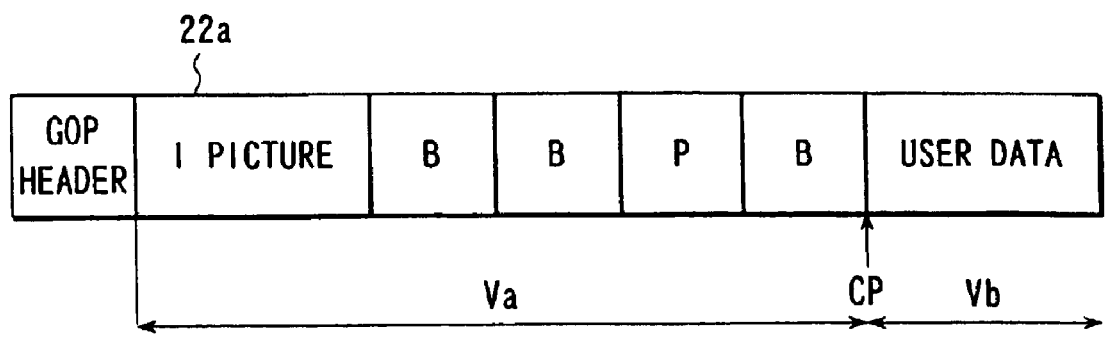
FIG. 5 is a conceptual view for explaining the operation of the second embodiment.
Figure 6:
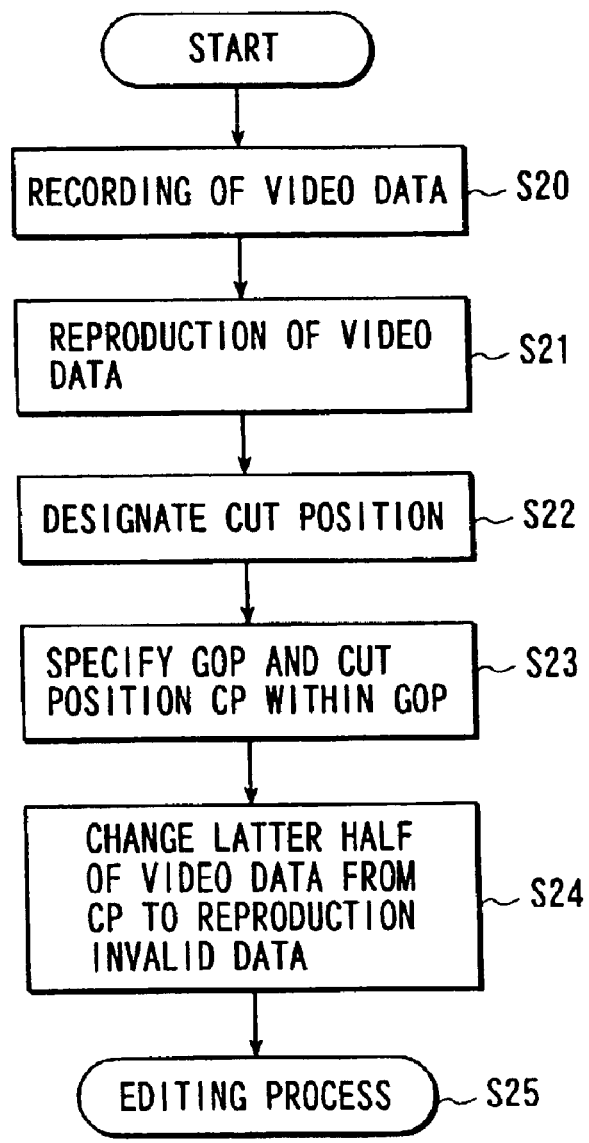
FIG. 6 is a flowchart for explaining the operation of the second embodiment.

The second embodiment has a function capable of selecting a former half Va or latter half Vb with respect to the cut position CP when the user designates the cut position CP, as shown in FIG. 5, and selects the latter half Vb of video information as cut information. In the first embodiment, the former half Va of video information is selected as cut data.

The operation of the second embodiment will be described with reference to a flowchart in FIG. 6. The CPU 10 of the DVD-RAM drive records on the disk 14 digital video information transferred from the host system 2 via the I/O interface 11 (step S20). The CPU 10 reads the recorded video information from the disk 14 and transfers it to the host system 2 via the I/O interface 11 in accordance with a command from the host system 2 upon an input from the user (step S21). Then, the video information (e.g., video information 20a in FIG. 2) designated by the user is reproduced on the display of the host system 2.

Assume that the user operates, e.g., the mouse to designate a cut position for cutting the latter half of the video information 20a while confirming the display (step S22). The CPU 10 specifies a GOP corresponding to the designated cut position and a cut position CP within the GOP on the basis of management information of the data management table 12 (step S23). As shown in FIG. 2, the cut position CP designated by the user is within a GOP included in the video information 20a.

The CPU 10 converts the latter half Vb with respect to the cut position CP of the specified GOP 21 to reproduction invalid data (user data) (step S24). The former half Va to be reproduced generally always includes I picture data. The above-described process of converting a picture to an I picture can therefore be omitted.

The CPU 10 sets an EX-A1 management table 12a1 for managing video information including a newly generated GOP 22a, and an EX-A2 management table 12a2 for managing video information 20a2 to be cut (step S25). In this case, video information composed of four GOPs (four GOPs of the former half of the video information 20a in FIG. 2) including the GOP 22a is managed as continuous reproduction data. In FIG. 3, the video information 20a2 not including any GOP 22 is managed as data which cannot be a target to be reproduced to be cut.

According to the second embodiment, in an editing process of cutting the latter half of the video information 20a being reproduced, even if the designated cut position CP is within the GOP, similar to the first embodiment, the GOP 21 can be divided at the position CP into the former half Va to be reproduced and the latter half Vb to be changed to data which cannot be a target to be reproduced (i.e., to be cut). This editing process allows the user to reproduce the video information 20a1 including the newly generated GOP 22a at the end. The video information 20a2 not including the GOP 22 at the cut position CP is cut as reproduction invalid data from the original video information 20a.

(Third Embodiment)

Figure 7:
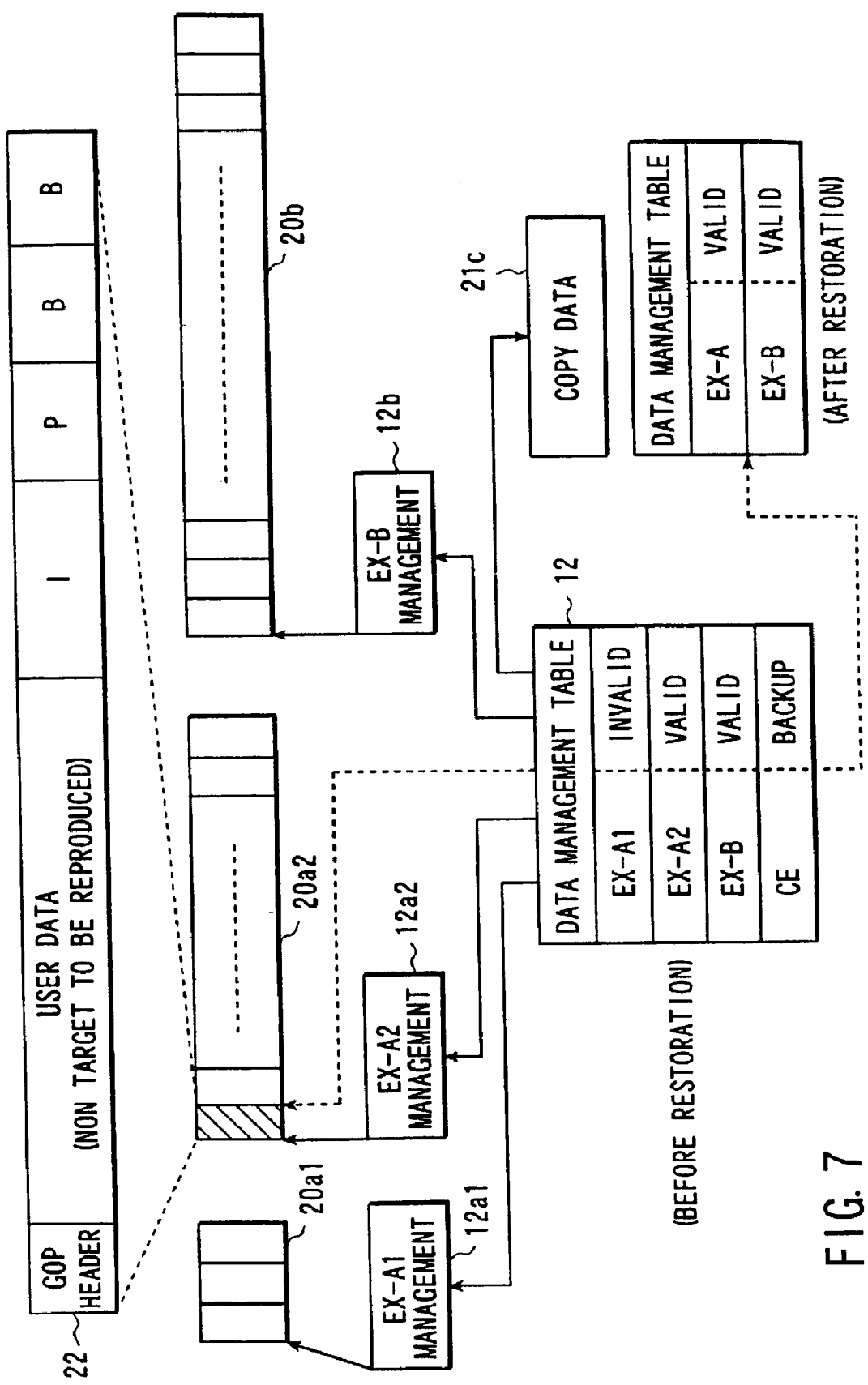
FIG. 7 is a conceptual view for explaining the operation of the third embodiment.
Figure 8:
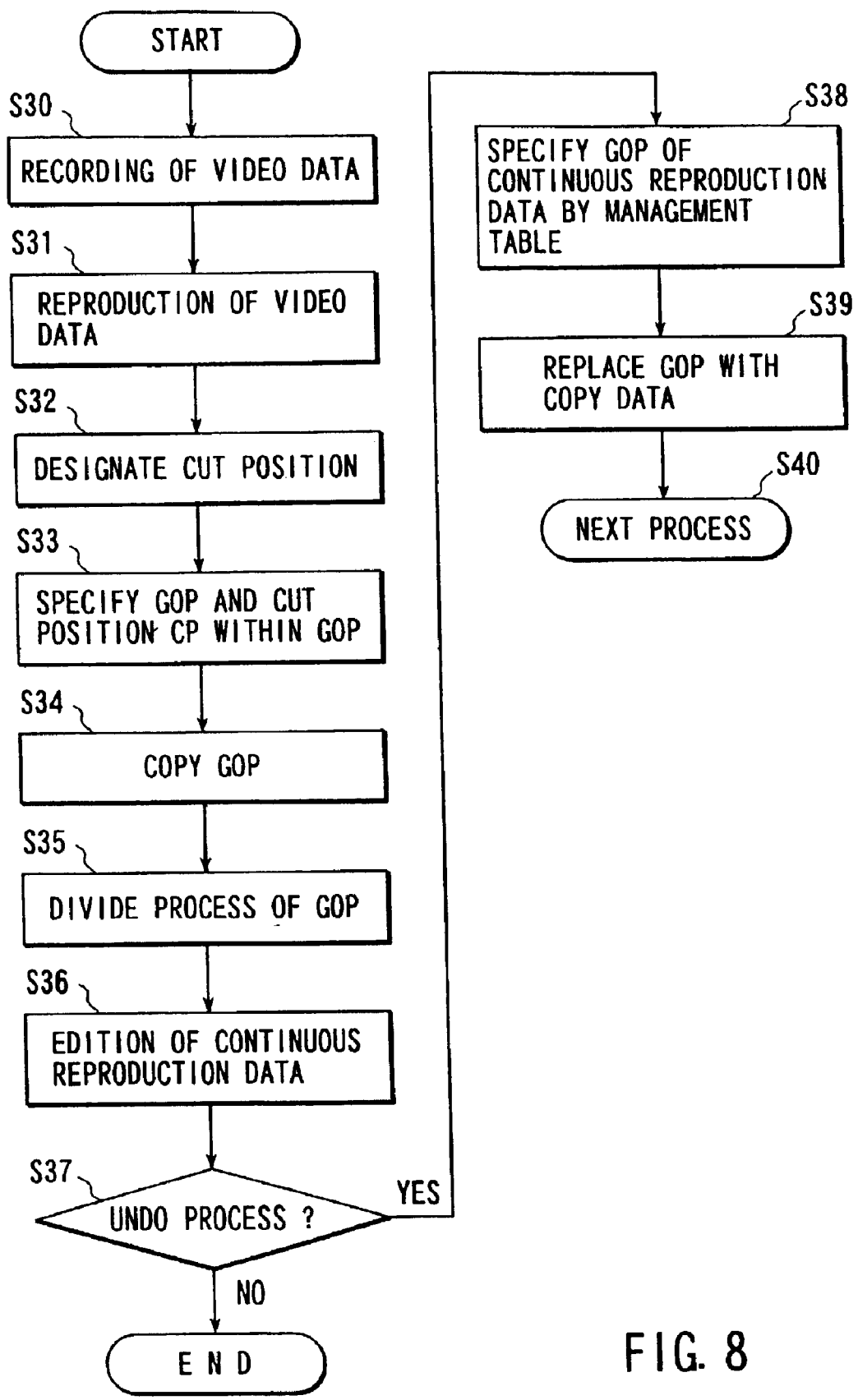
FIG. 8 is a flowchart for explaining the operation of the third embodiment.

The third embodiment has a function of saving copy data 21c of a GOP 21 to be edited shown in FIG. 7, as backup data on the disk 14, and a function of decoding the original GOP 21 using the copy data 21c.

The operation of the third embodiment will be described with reference to a flowchart in FIG. 8. The CPU 10 of the DVD-RAM drive records on the disk 14 digital video information transferred from the host system 2 via the I/O interface 11 (step S30). The CPU 10 reads the recorded video information from the disk 14 and transfers it to the host system 2 via the I/O interface 11 in accordance with a command from the host system 2 upon an input from the user (step S31). Then, the video information (e.g., video information 20a in FIG. 2) designated by the user is reproduced on the display of the host system 2.

Assume that the user operates, e.g., the mouse to designate a cut position for cutting the former half of the video information 20a while confirming the display (step S32). The CPU 10 specifies a GOP corresponding to the designated cut position and a cut position CP within the GOP on the basis of management information of the data management table 12 (step S33). As shown in FIG. 2, the cut position CP designated by the user is within a GOP included in the video information 20a.

The CPU 10 saves the copy data 21c of the specified GOP 21 as backup data on the disk 14 (step S34). Then, similar to the first embodiment, the CPU 10 divides the GOP 21 at the cut position CP (step S35). That is, the CPU 10 changes the start picture of the latter half Vb with respect to the cut position CP to I picture data, and changes the former half Va to reproduction invalid data.

As shown in FIG. 7, the CPU 10 sets an EX-A2 management table 12a2 for managing video information 20a2 including the newly generated GOP 22, and an EX-A1 management table 12a1 for managing video information 20a1 to be cut (step S36). The data management table 12 manages as continuous reproduction data each of the video information 20a2 managed by the EX-A2 management table 12a2 and the video information 20b managed by the EX-B management table 12b. The data management table 12 manages the video information 20a1 to be cut as data which cannot be a target to be reproduced.

Assume that the user designates undo process for the edited video information 20a2 (YES in step S37). The CPU 10 specifies the GOP 22 included in the video information 20a2 with reference to the data management table 12 (step S38). The CPU 10 further searches the data management table 12 for the copy data 21c corresponding to the specified GOP 22. The CPU 10 reads out the copy data 21c and replaces the GOP 22 included in the video information 20a2 with the readout copy data 21c (step S39). Accordingly, the edited GOP 22 is decoded to the original GOP 21.

The CPU 10 resets as reproduction valid data the video information 20a1 to be cut that is managed by the EX-A1 management table 12a1, and sets a new EX-management table for managing as continuous reproduction data the video information 20a1 and video information 20a2 including the decoded GOP 21 (step S40).

According to the third embodiment, the edited GOP 22 can be decoded to the original GOP 21 by saving as backup data the copy data 21c of the GOP 21 within which the cut position CP is set. Further, the video information can be decoded to the original video information before cut by setting video information to be cut with reference to the cut position CP to reproduction valid data, and managing the information as continuous reproduction data together with the video information including the decoded GOP 21.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video information editing system for rewriting a group of encoded video data items stored in a storage medium, the encoded video data items including at least a first type which is decoded without using another video data item and a second type which is decoded using another video data item, comprising:

setting means capable of setting a data division position within the group of video data items; and editing means for decoding the group of encoded video data items having the data division position, re-encoding the decoded group of encoded video data items, and overwriting the re-encoded group of encoded video data items on the group of encoded video data items having the data division position before editing in the storage medium such teat the encoded video data item located at the data division position is the first type.

2. A video information editing system for rewriting a group of encoded video data turns stored in a storage medium, the encoded video data items including at least a first type which is decoded without using another video data item and a second type which is decoded using another video data item, comprising:

colting means capable of setting a data division position within the group of encoded video data items;

determination means for determining whether the encoded video data item at the date division position is the first type; and editing means, when said determination means determines that the encoded video data item at the data division position is not the first type, for decoding the group of encoded video data items having the data division position, re-encoding the decoded group at encoded video data items, and overwriting the re-encoded group of encoded video data items on the group of encoded video data items having the data division position before ending in the storage medium such that the encoded video data item located at the data division position is the first type.

3. A system according to claim 2, wherein said editing means defines a data portion preceding the data division position as a reproduction invalid portion and a data portion succeeding the data division position as a reproduction portion.

4. A video edit method applied to a video information editing system for rewriting a group of encoded video data items stored in a storage medium, the encoded video data items including at least a first type which is decoded without using another video data item and a second type which is decoded using another video data item, comprising:

setting a data division position within the group of encoded video data items;

determining whether the encoded video data item at the data division position is the first type; and editing, when it is determined that the encoded video data item at the data division position is not the first type, comprising decoding the group of encoded video data items having the data division position, re-encoding the decoded group of encoded video data items, and overwriting the re-encoded group of encoded video data items on the group of encoded video data items having the data division position before editing in the storage medium such that the encoded video data item located at the data division position is the first type.

5. A system according to claim 2, wherein said setting means comprises means for setting the data division position within the group of encoded video data items, and designating, as a reproduction invalid portion, one of former and latter halves.

6. A system according to claim 3, further comprising data management table means for managing continuous reproduction data for each group of encoded video data items, and said data management table means comprises means for managing, as continuous reproduction data, a portion of the group of encoded video data items which is divided out using the position set by said setting means as a reference and edited by said editing means, and managing as reproduction invalid data, the remaining portion of the group of encoded video data items.

7. A system according to claim 1, wherein said first type includes an I picture (Intracoded image) and the second type includes a P picture (Predictive coded image) or a B picture (Bi-directionally predictive coded image).

8. A system according to claim 2, wherein said first type includes an I picture (Intracoded image) and the second type includes a P picture (Predictive coded image) or a B picture (Bi-directionally predictive coded image).

* * * * *

UNITED STATES PATENT AND TRADEMARK OFFICE
CERTIFICATE OF CORRECTION

PATENT NO. : 6,917,752 B2
DATED : July 12, 2005
INVENTOR(S) : Ito

It is certified that error appears in the above-identified patent and that said Letters Patent is hereby corrected as shown below:

Column 8,
Line 49, change "teat" to -- that --.
Line 53, change "turns" to -- items --.
Line 59, change "colting" to -- setting --.
Line 62, change "date" to -- data --.

Column 9,
Line 1, change "at" to -- of --.
Line 5, change "ending" to -- editing --.

Column 10,
Lines 17-18, change "managing as" to -- managing, as --.

Signed and Sealed this

Eighth Day of November, 2005

JON W. DUDAS
*Director of the United States Patent and Trademark Office*